United States Patent [19]
Stevens et al.

[11] Patent Number: 5,956,705
[45] Date of Patent: Sep. 21, 1999

[54] REVERSE-BYTE INDEXING

[75] Inventors: Larry Stevens, Los Altos; Wei Huang, Foster City; Alexander C. Ho, Belmont; Jonathan D. Klein, Pleasanton; Dinesh Das, Redwood City; Boris Klots, Palo Alto, all of Calif.

[73] Assignee: Oracle Corporation, Redwood Shores, Calif.

[21] Appl. No.: 08/741,076

[22] Filed: Oct. 30, 1996

[51] Int. Cl.[6] .................................................. G06F 12/30
[52] U.S. Cl. ........................................................... 707/2
[58] Field of Search .................................. 707/3, 1, 10, 2

[56] References Cited

U.S. PATENT DOCUMENTS

| | | | |
|---|---|---|---|
| 5,467,471 | 11/1995 | Bader | 707/1 |
| 5,490,258 | 2/1996 | Fenner | 711/1 |
| 5,629,695 | 5/1997 | Watts et al. | 341/51 |

*Primary Examiner*—Jack M. Choules
*Attorney, Agent, or Firm*—McDermott, Will & Emery

[57] ABSTRACT

A method and apparatus for inserting sorted data into an indexed table is provided. Two or more nodes are used to insert the data into the indexed table. Before an entry for each inserted row is stored in the index associated with the table, the key values in the index entry are transformed using an operation that affects the order of the key values. For example, the order of the bytes used to represent the key values in the index entry may be reversed. The index entries are stored in the portion of the index that corresponds to the transformed key values. As a result, the entries for consecutive key values will not necessarily be stored in the same portion of the index. Consequently, the nodes will not have to compete for a "hot" portion of an index if the nodes are inserting data with key values that fall into the same approximate range. The inverse of the transformation operation is performed on the transformed key values read from the index before the key values are supplied to the user.

20 Claims, 4 Drawing Sheets

FIG. 1
(PRIOR ART)

(PRIOR ART)

FIG. 4

REVERSE-BYTE INDEXING

FIELD OF THE INVENTION

The present invention relates to database systems, and more specifically, to techniques for creating an index for a set of data in a database system.

BACKGROUND OF THE INVENTION

Figure 1:
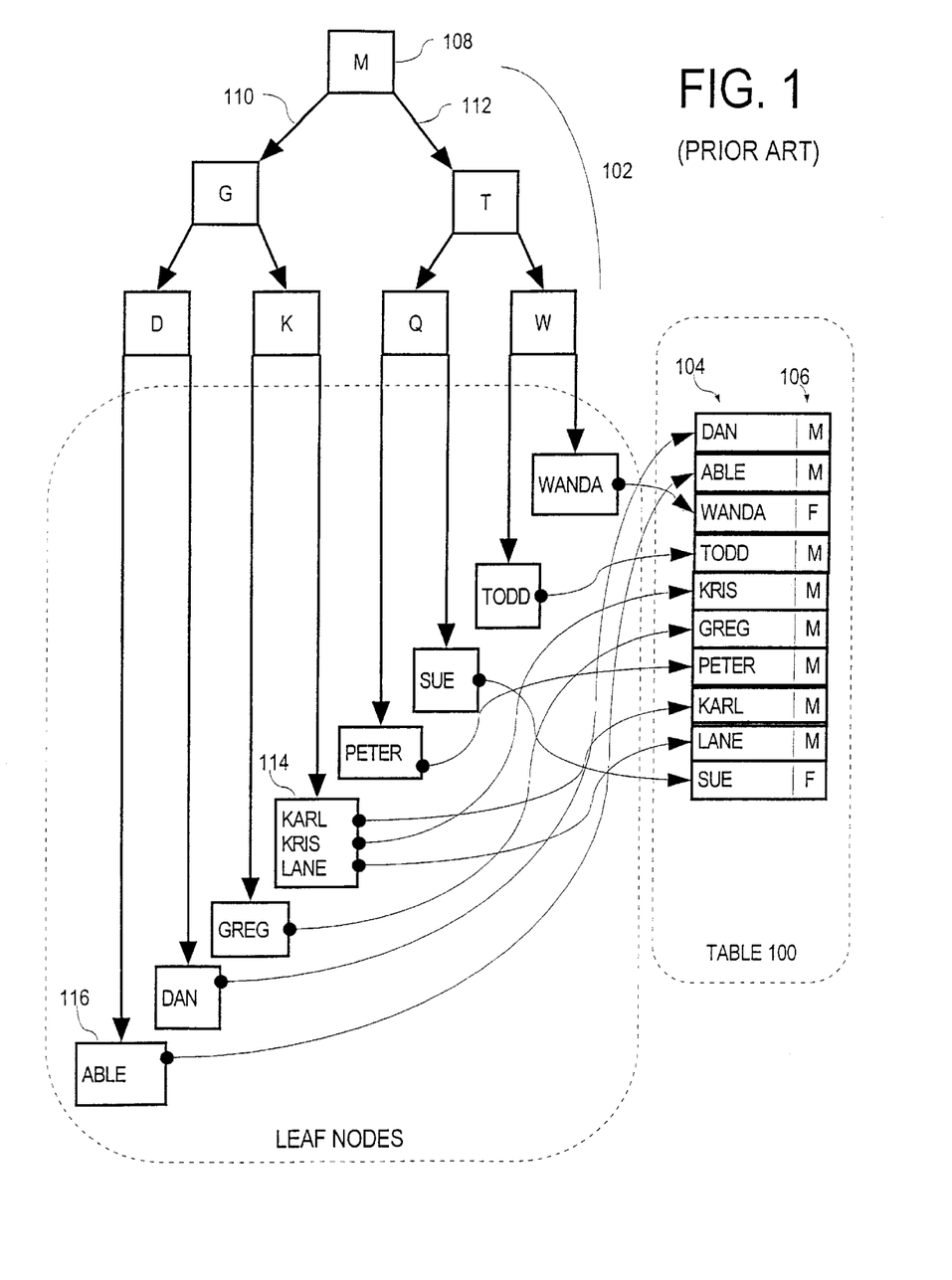
FIG. 1 is a block diagram of a table and an index for the table.

Indexes are data structures that provide relatively fast access to a set of data based on a key values. FIG. 1 illustrates an exemplary table 100 with a corresponding B-Tree index 102. The table 100 has a name column 104 and a gender column 106. The value in the name column 104 is used as the key of the B-Tree index 102. The B-Tree index 102 includes branch nodes and leaf nodes.

Branch nodes contain pointers to other nodes and data that indicates the range of values associated with the nodes to which they point. For example, node 108 contains pointers 110 and 112. Node 108 also stores the letter "M" to indicate that names that begin with the letters "A" through "L" are stored in the nodes attached to pointer 110 while the names that begin with the letters "M" through "Z" are stored in the nodes attached to pointer 112.

The leaf nodes of B-Tree 102 store key values and pointers to the rows of table 100 that correspond to the key values. For example, leaf node 114 contains three entries. The first entry stores the key value "KARL" and a pointer to the row in table 100 that contains the value "KARL" in the name column. The second entry of leaf node 114 stores the key value "KRIS" and a pointer to the row in table 100 that has the key value "KRIS". The third entry of leaf node 114 stores the key value "LANE" and a pointer to the row in table 100 that contains the key value "LANE".

As new data items are inserted into the base data, new entries that correspond to the new data items are added to the index. For example, if a record where the data for column 1 is "ANGIE" and the data for column 2 is "F" were added to table 100, a corresponding index entry would be added to leaf node 116 of B-Tree 102. The new index entry would include the key value "ANGIE" and a pointer to the new row added to table 100.

Figure 2:
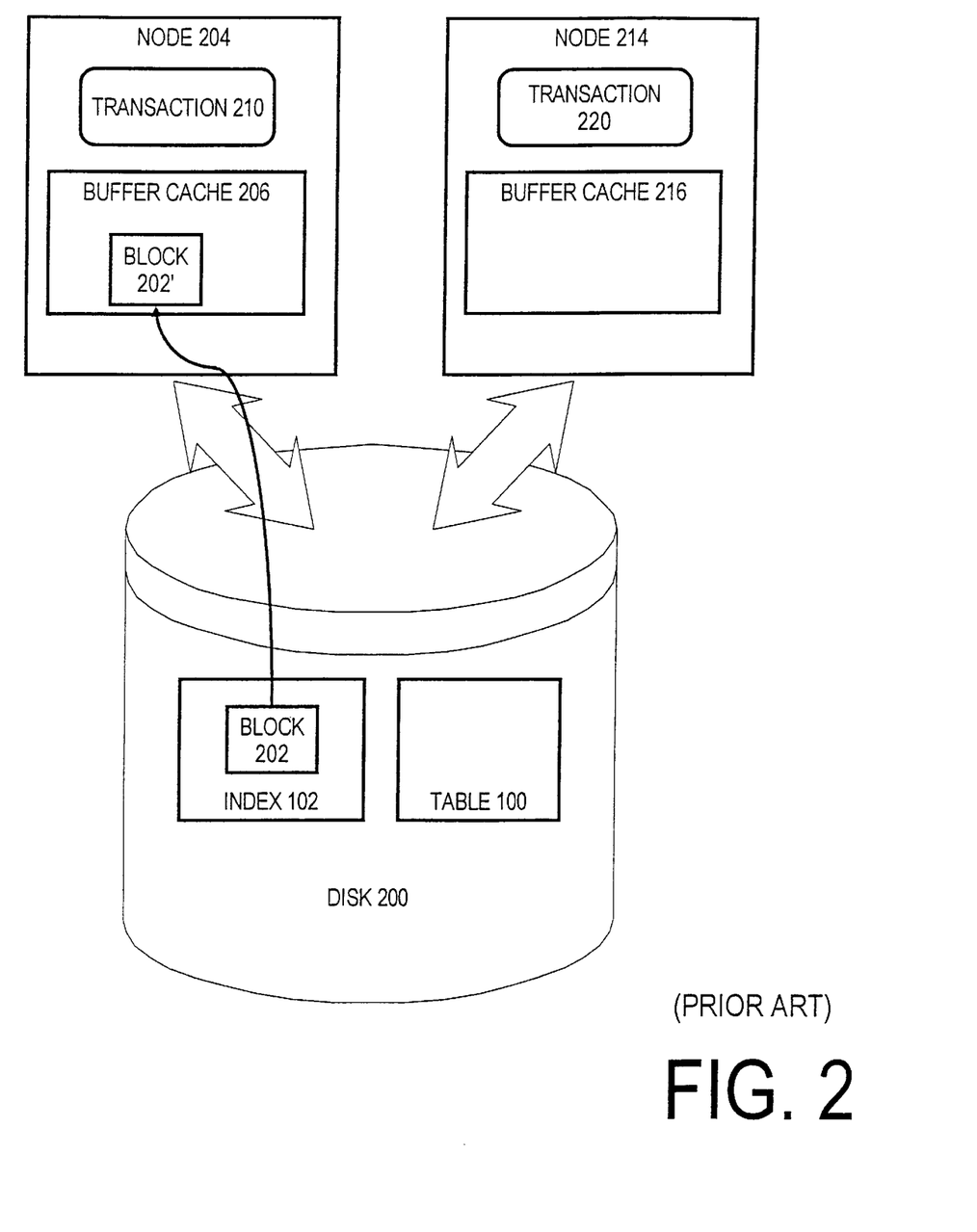
FIG. 2 is a block diagram of a two-node computer system where both nodes are inserting data into the same indexed table.

FIG. 2 illustrates a system that includes two nodes 204 and 214 and a disk 200. Nodes 204 and 214 generally represent processing units that have access to the one or more disks that contain the database in which table 100 is stored. Nodes 204 and 214 may be, for example, networked workstations or clusters of processors and memory components within a multi-processing machine.

Before an entry may be added to an index, the portion of the index into which the entry is to be added must be loaded into the dynamic memory of the node that is inserting the entry. For example, assume that a transaction 210 executing in node 204 specifies the insertion of a row containing the data "ANGIE, F" into table 100. Assume also that disk block 202 stores leaf node 116 of a B-Tree index 102. To insert the appropriate index entry into index 102, disk block 202 is loaded into buffer cache 206 of node 204. In illustration, the loaded copy of the block is shown as 202'. The copy 202' of disk block 202 that is stored in buffer cache 206 is updated with the appropriate index entry for "ANGIE". At a later time, the updated copy 202' of disk block 202 is stored back to disk 200.

Typically, the closer key values are to each other in the order used by the index, the more likely the index entries for the key values will be stored in the same portion of the index. For example, index entries for "KEN", "KENT" and "KENNETH" would all be stored in leaf node 114. Consequently, there is a high likelihood that index entries for data items with consecutive key values will be stored in the same portion of an index structure.

Under many conditions, data is entered into a database in such a way that consecutive entries have consecutive key values. For example, records may be keyed into a database system in alphabetic or numeric order. Even records that do not initially have an order with respect to each other may be assigned key values based on the order in which they arrive. For example, one way to assign a unique identifier to each piece of e-mail in an e-mail system is to assign each e-mail a strictly increasing number based on the order in which the e-mail is received.

When consecutively inserted data items have consecutive key values, the new index entries for the new data items are inserted into the same portion of the associated index. For the purposes of explanation, the portion of an index into which new entries will be inserted is referred to as the "target portion" of the index. For example, while rows that contain names that begin with the letters "A" through "C" are being added to table 100, leaf node 116 will be the target portion of index 102. During the insertion process, the rate at which the target portion is accessed will be relatively high, while the rate at which other portions of the index is accessed will be relatively low.

When only one node (e.g. node 204) is being used to insert data into table 100, the fact that one portion of index 102 is heavily accessed will typically not have adverse effects on the efficiency of the insertion process. For example, while rows with names beginning with the letters "A" through "C" are being added to table 100, block 202 will remain loaded in buffer cache 206. However, when two or more nodes are used to insert data into table 100, the fact that one portion of index 102 is heavily accessed by both nodes may lead to significant problems.

Specifically, each node must update the most recent version of block 202 to insert an index entry into leaf node 116. Therefore, if the version 202' of block 202 that is located in buffer cache 206 has been updated by node 204, the updated version 202' of block 202 must be written to disk 200 and loaded into buffer cache 216 before node 214 may insert an entry into leaf node 116.

The updated version 202' of block 202 that resides in buffer cache 216 would then have to be written to disk and loaded into buffer cache 206 before node 204 could insert a subsequent entry into leaf node 116. The transfer of data from the buffer cache of one node to the buffer cache of another node is referred to as a "ping". Pings involve a significant amount of overhead, including multiple I/O operations and lock-related communications.

Based on the foregoing, it is clearly desirable to provide a technique for reducing the number of pings that occur when more than one node is used to insert ordered data into an indexed body of data. It is further desirable to reduce the rate at which any particular portion of an index is accessed when more than one node is used to insert data.

SUMMARY OF THE INVENTION

A method and apparatus for inserting data into a indexed table is provided. Two or more nodes are used to insert the data into the indexed table.

Before an entry for each inserted row is stored in the index associated with the table, the key values in the index entry are transformed using an operation that affects the order of the key values. According to one embodiment, the order of the bytes used to represent the key values are reversed.

The index entries are stored in the portion of the index that corresponds to the transformed key values. As a result, the entries for consecutive key values will not necessarily be stored in the same portion of the index. Consequently, the nodes will not have to compete for a "hot" portion of an index if the nodes are inserting data with key values that fall into the same approximate range.

The inverse of the transformation operation is performed on the transformed key values read from the index before the key values are supplied to the user. The user therefore does not even have to be aware of the transformation. Queries on the table are processed by transforming the key values specified in the query and traversing the index based on the transformed key values. A query optimizer is provided which determines whether to process a query using the index based on whether the query requires a non-matching comparison between key values.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for processing index entries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 3:
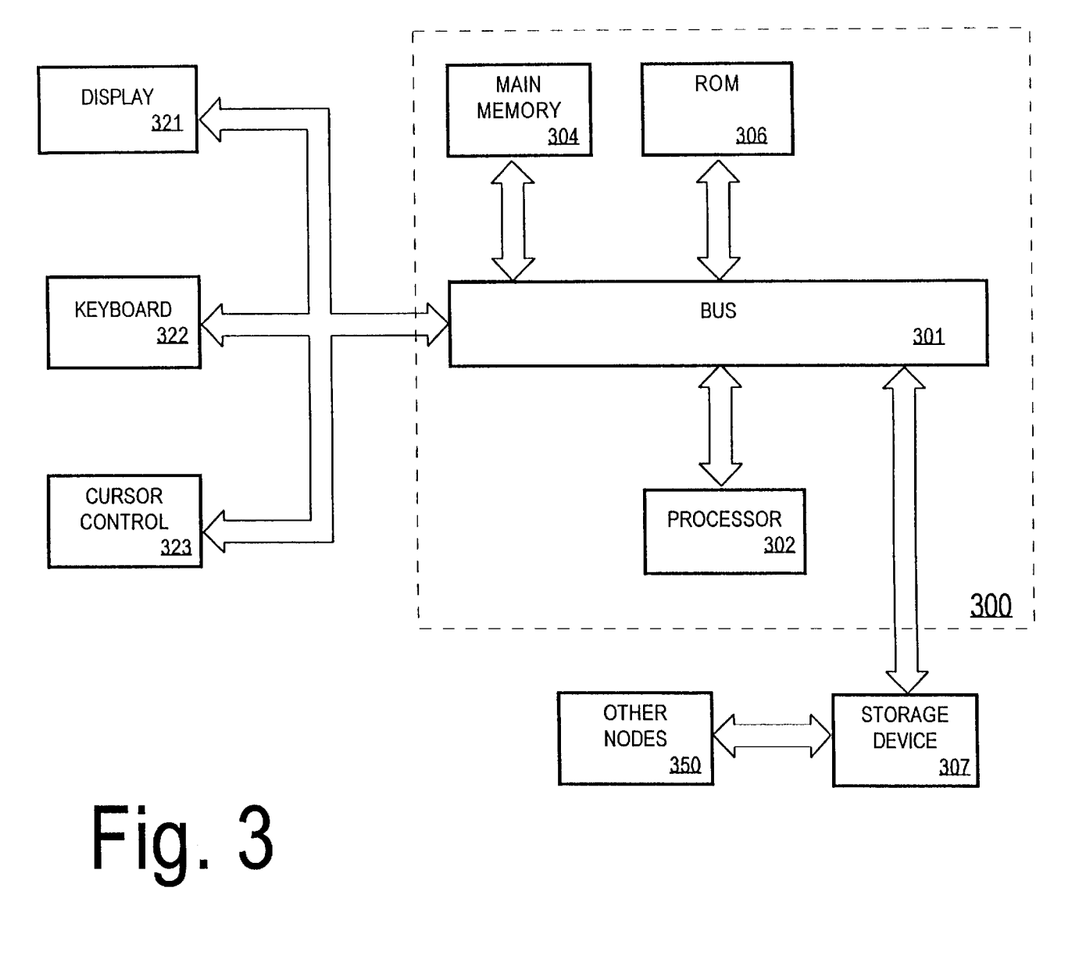
FIG. 3 is a block diagram of a computer system that may be used to implement an embodiment of the invention.

Referring to FIG. 3, it is a block diagram of a computer system 300 upon which an embodiment of the present invention can be implemented. Computer system 300 includes a bus 301 or other communication mechanism for communicating information and a processor 302 coupled with bus 301 for processing information. Computer system 300 further comprises a random access memory (RAM) or other dynamic storage device 304 (referred to as main memory) coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 generally represents one or more magnetic or optical disks that are accessible to both computer system 300 and to other nodes 350. Storage device 307 may store the files that comprise a database as well as the sequences of instructions which, when executed, implement a database server configured to operate as shall be described hereafter.

Computer system 300 can also be coupled via bus 301 to a display device 321, such as a cathode ray tube (CRT), for displaying information to a computer user. An alphanumeric input device 322, including alphanumeric and other keys, is typically coupled to bus 301 for communicating information and command selections to processor 302. Another type of user input device is cursor control 323, such as a mouse, a trackball, or cursor direction keys for communicating direction information and command selections to processor 302 and for controlling cursor movement on display 321. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 322 wherein all interface is provided via the stylus as a writing instrument (like a pen) and the written text is interpreted using optical character recognition (OCR) techniques.

The present invention is related to the use of computer system 300 to transform key values in a manner that maps index entries with consecutive key values to different portions of the index. According to one embodiment, key value transformation is performed by computer system 300 in response to processor 302 executing sequences of instructions contained in memory 304. Such instructions may be read into memory 304 from another computer-readable medium, such as data storage device. Execution of the sequences of instructions contained in memory 304 causes processor 302 to perform the process steps that will be described hereafter. In alternative embodiments, hard-wired circuitry may be used in place of or in combination with software instructions to implement the present invention. Thus, the present invention is not limited to any specific combination of hardware circuitry and software.

FUNCTIONAL OVERVIEW

According to one embodiment of the invention, before an index entry for a key value is inserted into an index, the key value is transformed using a transformation operation that affects the order of the key value. The index entry is then inserted based on the transformed key value. Because the transformation operation affects the order of the key value, the transformed values associated with two consecutive key values will not necessarily be consecutive. Therefore, the index entries associated with the consecutive key values may be inserted into unrelated portions of the index.

For example, the transformation operation may involve switching the positions of various portions of the key value.

According to one embodiment, the characters in a text string are reversed. Thus, the key words KEN, KENT and KENNETH would be converted to NEK, TNEK and HTENNEK, respectively. Because the transformed key values begin with the letters "N", "T" and "H", index entries for the key values would be inserted into different portions of an index.

When the index is used to process a query, the key values in the query are transformed using the same transformation operation as was used to transform the key values of the index entries. For example, if a query requires the retrieval of all rows containing the name "KEN", the word "KEN" in the query is transformed into "NEK" and the index 102 is traversed to find the leaf node that would contain the key word "NEK". The database server would then follow the pointers associated with any index entries for the key work "NEK" to determine the location of the rows that contain the name "KEN".

Before key values from the index entries are presented to a user or to other parts of the database system, the inverse of the transformation operation is performed. In the example given above, the transformation operation is its own inverse. That is, a second reversal of the characters in a string on which a reversal has been performed recreates the initial character string. Thus, a reversal of "KEN" yields "NEK", and a reversal of "NEK" yields "KEN".

Figure 4:
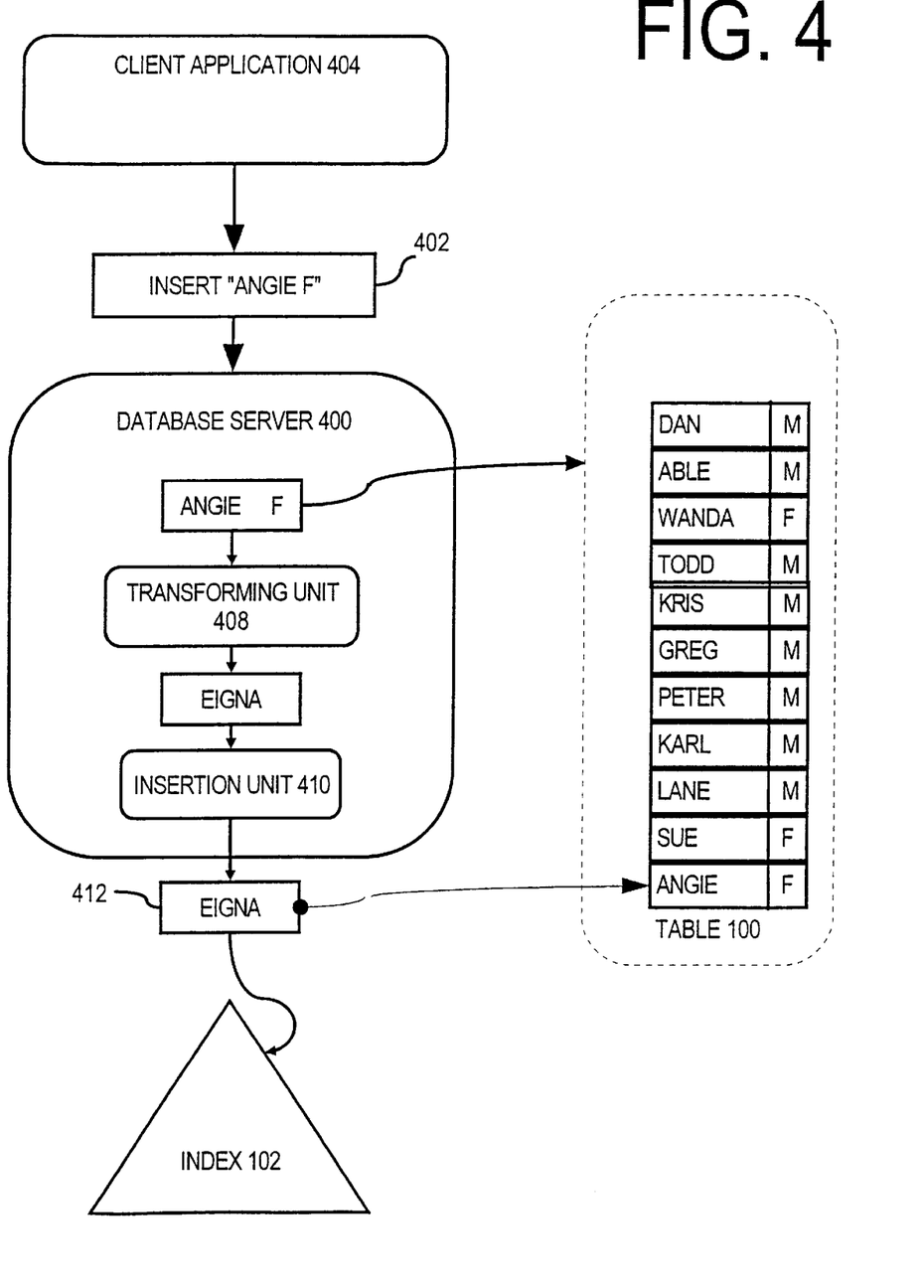
FIG. 4 is a block diagram of a database server configured with a transformation unit for transforming key values of index entries according to an embodiment of the invention.

FIG. 4 is a block diagram illustrating the operations performed by a database server 400 that implements an embodiment of the invention. A client application 404 issues a command 402 that requires the insertion of an entry "ANGIE, F" into table 100. The database server 400 inserts the entry into table 100. A transformation unit 408 in the database server reverses the characters of the key word "ANGIE" to produce a transformed key word "EIGNA". The transformed key word is passed to an insertion unit 410 that inserts an entry 412 into the index 102 associated with table 100. The entry includes the transformed key word "EIGNA" and a pointer to the newly inserted row that contains "ANGIE, F" in table 100. The entry is stored in the leaf node of index 102 that is associated with the value "EIGNA", rather than the leaf node that would store the entry for the key word "ANGIE".

The character reversal function described above is merely exemplary. Various other transformations may be used to yield transformed key values that more evenly distribute consecutive entries across the index structure. For example, within a computer system, all types of data (e.g. character strings, integers, real numbers) are stored as a sequence of bytes. According to one embodiment of the invention, key values are transformed before insertion into the index by reversing the order of the bytes. A byte reversal transformation operation can be more generically applied than the character reversal transformation described above, since it does not assume that the key values are character strings. An embodiment that uses byte-reversal transformation shall be described in greater detail with reference to Tables 1–3.

Table 1 illustrates a table that has three columns and four rows. The three data. Specifically, column A stores a number, column B stores a string of characters, and column C stores a date.

TABLE 1

| A | B | C | |
|---|---|---|---|
| 10001 | fghij | 95.10.25 | 23:07:58 |
| 10002 | klmno | 95.10.25 | 23:17:03 |
| 10003 | pqrst | 95.10.25 | 23:26:25 |

Table 2 illustrates how a database system may store the data in Table 1 as a series of bytes. In Table 2, each byte is represented by a two-digit hexadecimal number. The first byte in each column indicates how many subsequent bytes are used to represent the stored value. For example, the number 10001 is represented by the four bytes c3 02 01 02. Therefore the four bytes that represent the number 10001 are preceded by the byte 04. The fourth column in Table 2 stores a unique identifier that is assigned to each row "rowid").

TABLE 2

| (number) A | (varchar) B | (date) C | (rowid) |
|---|---|---|---|
| 04 c3 02 01 02 | 05 66 67 68 69 6a | 07 cb 0a 19 17 07 3a 00 | 0c 00 03 5e 00 fe |
| 04 c3 02 01 03 | 05 6b 6c 6d 6e 6f | 07 cb 0a 19 17 11 03 00 | 08 00 03 b3 01 0d |
| 04 c3 02 01 04 | 05 70 71 72 73 74 | 07 cb 0a 19 17 1a 17 00 | 5c 4a 22 16 01 45 |

Table 3 illustrates how index entries for the data in Table 2 are transformed for insertion into a reverse-byte-order index according to an embodiment of the invention. As illustrated in Table 3, the first byte in each column still indicates how many subsequent bytes are used to represent the stored value. However, the actual bytes that represent the key values are in reverse order. Thus, the number 10001 is represented by the bytes 02 01 02 c3, rather than the bytes c3 02 01 02. Similarly, the character string "fghij " is represented by the bytes 6a 69 68 67 66 rather than 66 67 68 69 6a. The rowid values are used as pointers to identify the rows that correspond to the entries, and are not themselves key values. In the exemplary index entries shown in Table 3, the rowid values have not been transformed.

TABLE 3

| (number)<br>A | (varchar)<br>B | (date)<br>C | (rowid) |
|---|---|---|---|
| 04 02 01 02 c3 | 05 6a 69 68 67 66 | 07 00 3a 07 17 19 0a cb | 0c 00 03 5e 00 fe |
| 04 03 01 02 c3 | 05 6f 6e 6d 6c 6b | 07 00 03 11 17 19 0a cb | 08 00 03 b3 01 0d |
| 04 04 02 01 c3 | 05 74 73 72 71 70 | 07 00 17 1a 17 19 0a cb | 5c 4a 22 16 01 45 |

When data is sorted before it is entered into the database, the sort order is affected more by the high order (leftmost) bytes of the key values than the low order (rightmost) bytes. Similarly, when inserting the key values into an index, the portion of the index into which the index entries are inserted is affected more by the high order bytes than the low order bytes of the key values. Consequently, when the byte order of key values is reversed for the purposes of inserting entries into an index, the index entries for sorted data are less likely to fall into the same portion of the index. When sorted input is being inserted from two or more nodes, the decreased likelihood that the two or more nodes will be competing for the same portion of the index may yield a significant increase in the efficiency of the input operation.

In a reversed-byte-order index, the index entries are stored according to the transformed key values. Therefore, the key values represented by the entries in a leaf node will not necessarily fall in the value range associated with the leaf node. For example, a leaf node associated with the range "A"–"D" would store entries for words that end in "A" or "D", while entries for key values that begin with letters that fall in the range "A"–"D" may be stored in any of the leaf nodes. Consequently, queries that involve a non-matching comparison between key values cannot be efficiently processed by reversed-byte-order indexes.

For example, assume that a query requests all rows that contain names that alphabetically precede the name "KAREN". Names that alphabetically precede the name "KAREN" may end in any letter. Therefore, index entries for the rows that precede the name "KAREN" could be in any leaf node of a reversed-byte-order index. Consequently, to process such a query using the reversed-byte-order index would require the inspection of all of the leaf nodes of the index 102. Under such circumstances, using the reversed-byte-order index to process the query is not efficient.

According to one embodiment of the invention, database server 400 includes a query optimizer that determines how each query should be processed. If the query optimizer receives a query that requires a matching comparison (e.g. name=DAN) then the query optimizer determines that the reversed-byte-order index is to be used to process the query. If the query optimizer receives a query that requires a non-matching comparison (e.g. name<"FRED"), then the reversed-byte-order index is not used to process the query. It should be understood that the query optimizer may use many other factors in addition to whether the query specifies a non-matching comparison when determining how to process a given query.

INDEX ROT

Index rot occurs when the leaf nodes of an index become empty or sparsely populated due to deletions of the data items for which the leaf nodes contained index entries. Index rot often occurs when the data items that are indexed have a short life span.

For example, e-mail messages may be assigned a unique identifier based on the order in which the messages arrive in the e-mail system. If an index for accessing the e-mail is built on the e-mail identifier, then the index entries for all of the e-mail messages that arrive within a particular time period will reside in the same leaf node of the index. The index entries will be deleted when the corresponding messages are deleted, leaving unused space in the leaf nodes. This space will typically remain unused, since newly arriving e-mail will be assigned identifiers based on their arrival order, which identifiers will correspond to a different part of the index. Under these conditions, the only way to recover the unused space is to re-balance or re-build the index. Rebalancing and rebuilding operations are expensive and may render the index unusable while the operations are being performed.

Indexes that are built and maintained according to embodiments of the present invention reduce the effects of index rot. For example, the order of the bytes that represent an e-mail identifier may be reversed before the index entries for the e-mail messages are inserted into the index. As a result, the index entries for the e-mail messages that arrive in a given period of time will be spread over numerous leaf nodes. When an index entry is deleted, it is more likely that the space that the index entry occupied will be re-used, since the reversal of the bytes of the identifiers assigned to newly arriving e-mail messages may create a transformed key value that corresponds to the same leaf node as the deleted index entry.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for inserting entries into a hierarchical tree-structured index, the method comprising the steps of:

receiving an entry to be inserted into the hierarchical tree-structured index;

identifying a key value in said entry;

generating a transformed key value by performing an operation on said key value; and generating a transformed entry that includes said transformed key value;

storing said transformed entry in a location within said hierarchical tree-structured index that is based upon said transformed key value;

wherein said transformed key value causes said transformed entry to be stored at a location within said hierarchical tree-structured index that is different than a location in which said entry would have been stored based on said key value.

2. The method of claim 1 wherein:

said key value includes a series of data bits arranged in an order; and the step of generating said transformed key value includes changing the order of said series of data bits.

3. The method of claim 2 wherein:

the series of data bits is a series of bytes; and the step of changing the order of said series of data bits includes changing the order of said series of bytes.

4. The method of claim 3 wherein the step of changing the order of said series of bytes is performed by reversing the order of said series of bytes.

5. The method of claim 1 further including the steps of:

in response to executing, on a first node, a first transaction that inserts a first set of data into a body of data associated with said hierarchical tree-structured index, generating the entry;

in response to executing, on a second node, a transaction that inserts a second set of data into the body of data associated with said hierarchical tree-structured index, generating a second entry;

identifying a second key value in said second entry;

generating a second transformed key value by performing an operation on said second key value;

generating a second transformed entry that includes said second transformed key value; and storing said second transformed entry in a location within said hierarchical tree-structured index that is based upon said second transformed key value;

wherein the key value and the second key value would have caused said first entry and said second entry to be stored at consecutive locations within said hierarchical tree-structured index; and the transformed key value and said second transformed key value cause said first transformed entry and said second transformed entry to be stored at non-consecutive locations within said hierarchical tree-structured index.

6. The method of claim 1 further comprising the steps of:

receiving a query that specifies a body of data associated with said hierarchical tree-structured index;

identifying a specified key value in said query;

generating a transformed search key by performing said operation on said specified key value;

locating a portion of said hierarchical tree-structured index based on said transformed search key; and inspecting said portion of said hierarchical tree-structured index to determine which data within said body of data satisfies said query.

7. The method of claim 1 further comprising the steps of:

receiving a query that specifies data in said body of data;

determining whether said query involves a non-matching comparison;

if said query involves a non-matching comparison, then processing said query without using said hierarchical tree-structured index; and if said query does not involve a non-matching comparison, then using said hierarchical tree-structured index to process said query.

8. The method of claim 1, further comprising the step of reconstructing said key value from said transformed entry by performing an inverse transformation on said transformed key value.

9. A multi-node computing environment comprising:

a body of data stored on one or more storage devices;

a hierarchical tree-structured index associated with said body of data, said hierarchical tree-structured index being stored on said one or more storage devices;

a first node inserting data into said body of data associated with said hierarchical tree-structured index;

a second node inserting data into said body of data associated with said hierarchical tree-structured index;

a transformation mechanism for generating transformed key values based on key values contained in said data being inserted into said body of data by said first and second nodes;

an insertion mechanism for inserting entries into said hierarchical tree-structured index based on said transformed key values;

said transformed key values causing said entries to be inserted at locations within said hierarchical tree-structured index that are different than where said entries would be inserted if inserted based on said key values.

10. The multi-node computing environment of claim 9 wherein the transformation mechanism is configured to transform key values by re-ordering portions of said key values.

11. The multi-node computing environment of claim 10 wherein the transformation mechanism is configured to reverse the order of bytes in said key values.

12. The multi-node computing environment of claim 11 further comprising a query processing mechanism which determines whether to use said hierarchical tree-structured index to process queries on said body of data based on whether said queries require non-matching comparisons.

13. The multi-node computing environment of claim 9, further comprising an inverse transformation mechanism for reconstructing said key values from said transformed key values that are stored in said hierarchical tree-structured index.

14. A method for inserting data into a body of data, the method comprising the steps of:

inputting a first set of data into a first node;

storing said first set of data into said body of data;

identifying a first key value in said first set of data, said first key value corresponding to a particular portion of a hierarchical tree-structured index that is associated with said body of data;

transforming said first key value to create a first transformed key value;

identifying a first portion of said hierarchical tree-structured index based on said first transformed key value;

loading said first portion of said hierarchical tree-structured index into said first node;

storing a first index entry that includes said first transformed key value into said first portion of said hierarchical tree-structured index;

inputting a second set of data into a second node;

storing said second set of data into said body of data;

identifying a second key value in said second set of data, said second key value corresponding to said particular portion of said hierarchical tree-structured index that is associated with said body of data;

transforming said second key value to create a second transformed key value;

identifying a second portion of said hierarchical tree-structured index based on said second transformed key value, said second portion of said hierarchical tree-structured index being different than said first portion of said hierarchical tree-structured index;

loading said second portion of said hierarchical tree-structured index into said second node while said first portion of said hierarchical tree-structured index is loaded in said first node; and storing a second index entry that includes said second transformed key value into said second portion of said hierarchical tree-structured index.

15. The method of claim 14 further comprising the steps of:

executing on said first node a first database server that has access to said body of data; and while executing said first database server, executing on said second node a second database server that has access to said body of data;

wherein said step of transforming said first key value is performed by said first database server; and wherein said step of transforming said second key value is performed by said second database server.

16. The method of claim 14 wherein:

the step of transforming said first key value includes reversing a series of bytes that represent said first key value; and the step of transforming said second key value includes reversing a series of bytes that represent said second key value.

17. The method of claim 14 further comprising the steps of:

receiving a query on said body of data;

determining whether said query requires a non-matching comparison;

processing said query without using said hierarchical tree-structured index if said query requires a non-matching comparison; and processing said query using said hierarchical tree-structured index if said query does not require a non-matching comparison.

18. The method of claim 14 wherein:

the step of inputting said first set of data into said first node includes inputting a first set of data in an order that is based on said first key value; and the step of inputting said second set of data into said second node includes inputting a second set of data in an order that is based on said second key value.

19. The method of claim 14, further comprising the step of performing an inverse transformation on transformed key values stored in said hierarchical tree-structured index to recreate original key values.

20. A method for inserting entries into an index, the method comprising the steps of:

receiving an entry to be inserted into the index;

identifying a key value in said entry;

generating a transformed key value by performing an operation on said key value;

generating a transformed entry that includes said transformed key value;

storing said transformed entry in a location within said index that is based upon said transformed key value;

wherein said transformed key value causes said transformed entry to be stored at a location within said index that is different than a location in which said entry would have been stored based on said key value; and reconstructing said key value from said transformed entry by performing an inverse transformation on said transformed key value.

* * * * *